United States Patent Office 3,179,529
Patented Apr. 20, 1965

3,179,529
BINDER COMPOSITION FOR GYPSUM WALLBOARD
Lawrence J. Hickey, Livingston, and Emil D. Mazzarella, Plainfield, N.J., assignors to National Starch and Chemical Corporation, New York, N.Y., a corporation of Delaware
No Drawing. Filed Mar. 8, 1962, Ser. No. 178,262
6 Claims. (Cl. 106—115)

This invention relates to an improved method of making gypsum wallboard. More particularly, it relates to novel binder compositions, used in the manufacture of gypsum wallboard.

Gypsum wallboard generally comprises an incombustible core material, essentially gypsum ($CaSO_4 \cdot 2H_2O$), which is surfaced with sheets of fibrous material, such as paper or paperboard. The core material, or as it is commonly called, the gypsum stucco, consists for the most part of partially dehydrated gypsum ($CaSO_4 \cdot \frac{1}{2} H_2O$), along with minor quantities of various metal salts, wood fiber, glass fiber, asbestos fiber, or similar filler materials. In the manufacture of gypsum wallboard, the gypsum and other ingredients of the core material are dry blended and the resulting mixture is then fed into a continuous blender wherein water and foaming agents are added. The slurry is then metered onto a travelling web of paper board and then passes under a roll where a second sheet of paper board is applied to produce the composite wallboard. After the gypsum core has hardened, the finished wallboard is then dried under controlled temperature conditions.

In order to enhance the strength of the bond between the gypsum stucco core and the paperboard liners, waste starches, corn flours, acid hydrolyzed starches and similar low cost starch containing binding materials have often been incorporated in the dry blend together with the stucco. When the gypsum-water slurry sets and the wallboard is subjected to the heat drying operation, gypsum crystals grow into the paper interstices forming a physical bond with the paper fibers of the surface sheets. During this heating operation, the above noted binder material migrates to the core face and appears to act as a protective barrier for the gypsum's water of crystallization, that is, these starch binders prevent the dehydration of the gypsum crystals which have bonded with the paperboard. In order to be effective in the commercial manufacture of gypsum wallboard, these starch and starch containing binders are commonly added in amounts ranging from 0.5% to 1.0% by weight of the gypsum stucco.

In an effort to realize improved binding effectiveness, and increased manufacturing economy, attempts have been made to utilize various substitutes for the starch binders previously used in gypsum wallboard manufacture. These substitutes were employed since the starch binders heretofore used were found to possess several undesirable features. Thus, when these starch binders were utilized, the density of the gypsum core could not be reduced beyond a designated minimal value without an accompanying diminution of the degree of binding between the paper and the stucco. Moreover, these starch mixtures have impeded the drying of the wallboard since they hinder to some extent the passage of water vapor from the stucco core through the fiber board surface sheet. In addition, it would be advantageous to employ binders which could withstand drying temperatures which are higher than those that can be tolerated by the materials heretofore used for this purpose.

It is an object of this invention to provide a highly effective and economical method of making gypsum wallboard. Another object of this invention is to provide a novel binding composition for gypsum wallboard. A further object of this invention is to provide a gypsum wallboard which exhibits enhanced processing characteristics as well as considerable resistance to delamination. Other objects and the advantages of this invention will be apparent from the discussion that follows hereinafter.

In accordance with this invention, binder compositions for gypsum wallboard are formulated utilizing as binder aids for the stucco core certain starch ether or starch ester derivatives, whose compositions will be hereinafter described. The incorporation, using the process of our invention, of these starch derivatives in the dry blends used to prepare the wallboard core permits the preparation of products which can be rapidly dried, easily handled, and economically manufactured.

The starch derivatives employed as binders in the process of our invention comprise low viscosity starch ethers and starch esters having certain prescribed characteristics. In order to satisfy the exigencies of gypsum wallboard manufacture, the binders utilized must possess several characteristics. Such binders must not detrimentally affect the hardening or setting of the gypsum core which occurs before the wallboard is dried. These binders must be stable and must resist retrogradation in water solution over extended periods of time. The starch derivatives should also be able to form films at room temperature when such films are cast from a water solution. The starch binders must be compatible with commonly used constituents of gypsum stucco cores and should also be hydrophilic in nature. We have found that all of the aforedescribed features are adequately satisfied by the use of the herein described starch ethers and starch esters, each of which is required to have a degree of substitution (D.S.) of from about 0.01 to about 0.14 as well as a water fluidity (W.F.) value of at least 50. Degree of substitution represents that fraction of the primary hydroxyl groups of the starch molecule which have been substituted or derivatized with an ether or ester group substituent. Water fluidity is a means of describing the viscosity of the starch solution. As the water fluidity values increase, the viscosities of the starch solutions decrease.

The water fluidity values of the starch derivatives used in the process of our invention are determined by means of the following procedure:

A sample of the starch derivative varying in size from 7 to 15 grams is weighed out and placed, with 100 cc. of water, in a 150 cc. copper beaker. With constant stirring, the aqueous slurry of the derivative is then heated for 30 minutes in a water bath maintained at 100° C. At the end of the heating period, the sample is removed from the water bath and any water that may have evaporated from the slurry is replaced. After the sample has cooled to about 82° C., it is poured into the standard cup used in the Stormer Shear Viscometer, which is maintained at 82° C. Using a large paddle, the time required for 100 revolutions of the rotor is then measured on the viscometer. The water fluidity value is then determined from a chart that calibrates viscosity in relation to the time required for 100 revolutions of the rotor, as based on the sample size used. Thus, the less time required under these conditions for 100 revolutions of the rotor, the lower will be the viscosity of the sample, as reflected, in turn, by a higher water fluidity value.

Among the various starch ethers which may be used as the binders in the process of this invention, are included hydroxyethyl, hydroxypropyl, tertiary aminoalkyl, and comparable starch ethers. Among the various starch esters that may be used in the process of this invention, are included acetates, succinates, sulfates, maleates, phosphates, octenyl succinates, and comparable starch esters. As was previously mentioned, it is necessary that these starch derivatives possess a D.S. and a W.F. within the prescribed limits for these values. These starch derivatives may be used in combination with other binder aids, such as mannogalactan gums, urea-formaldehyde resins, raw starches, and similar materials.

The starch ethers and starch esters for use in the process of this invention may be derived from any of the commonly used starch bases, such as corn, high amylose corn, sago, wheat, rice, sweet potato, sorghum, waxy sorghum, waxy maize, potato, arrowroot, or tapioca, as well as components or fractions of these starches, such as amylose or amylopectin. It is to be noted that, although starches and starch containing materials have been used previously as binders for gypsum wallboard, the starch derivatives used in this invention have not heretofore been employed as such binder aids.

The exact amount of binder to be added to the gypsum stucco is not critical to our invention since the optimum amount of the starch derivative used is dependent upon such factors as the surface characteristics of the paperboard surfaces, the density of the wallboard, the composition of the stucco, and the drying temperatures employed. Usually, from about 0.05% to about 3.0% of binder, as based on the weight of stucco, is utilized. As was pointed out previously, a particularly advantageous feature of the use of our starch derivatives in wallboard manufacture lies in the fact that relatively small amounts of these binders may be used without detrimentally affecting the board's resistance to delamination. Thus, the employment of 0.075% by weight of one of the starch derivatives of our process is sufficient to effect an excellent bond between the gypsum core and the paper board liners, whereas as much as 1% by weight of the previously utilized binder was heretofore required to obtain such a bond. It can be seen, therefore, that the use of such exceedingly small amounts of our binder materials enables substantial economic benefits to be realized. In addition, higher concentrations of our starch derivatives (that is, from about 0.5% to about 1% by weight, as based on the weight of stucco) enable the density of the gypsum core to be reduced considerably. Such a decrease in the core density has not been possible when equivalent amounts of the starch binders heretofore utilized have been employed. The reduction of core density has heretofore usually resulted in delamination of the wallboard product. The starch derivatives of the present process can be used to prepare cores of reduced density without sacrificing the strength of the bond between the core and the paper liners. These lower density gypsum wallboards, because of their lighter weight, not only lower the cost of their manufacture, but also result in savings with respect to their subsequent shipment and handling.

The gypsum wallboard prepared by the process of this invention comprises two sheets of paper bonded to both surfaces of the gypsum core wherein our novel binder composition is contained. The process followed in making the wallboard is one that is a standard procedure in the field of wallboard manufacture. Gypsum, together with an accelerator such as potassuim sulfate to set the gypsum, land plaster, the starch derivative, and various other ingredients and filters (e.g., wood fibers, paper fibers, glass fibers) are first dry blended. This dry blend is then fed into a continuous blender where the core density is lowered by the addition of water and foaming agents, the latter being anionic surface active agents, such as sodium abietate, various alkyl aryl sulfonates, various alkyl aryl sodium sulfonates, and the like. This mixture is blended until it is of a smooth consistency. The smooth gypsum slurry is then spread evenly over a web of paper board or like material. A second sheet of paper board or like material is then placed over this coated board and excess plaster is pressed from the frame. The composite wallboard is allowed to set for a short time and thereafter is subjected to a suitable drying cycle.

In the following examples, which further illustrate the embodiment of this invention, all parts given are by weight, unless otherwise indicated.

*Example I*

This example illustrates the superior effectiveness of our binding compositions with respect to the smaller quantities of our compositions which are required to obtain satisfactory binding in comparison with the starch binders previously utilized in gypsum wallboard manufacture.

In making the gypsum wallboard wherein the binding compositions of our process are contained, the procedure set forth hereinafter was followed. In this procedure, land plaster (i.e., fully hydrated calcium sulfate) and a foaming mixture, such as those heretofore described, are separately prepared. The land plaster is subsequently blended with stucco, an accelerator (i.e., potassium sulfate), paper fiber or other filler material, and a starch derivative having the aforedescribed properties required for use in the process of our invention. This blend is thereupon mixed with a large quantity of water, with care being taken to avoid lumping of the mixture. The foaming mixture mentioned above is then added to the formulation and the resulting blend is mixed until it is of a smooth, creamy consistency. The smooth gypsum slurry is then spread evenly over a web of paper board or similar liner. A second sheet of paper board or similar liner is then placed over this coated board and excess plaster is pressed from the frame. After the gypsum core has hardened and set, the composite wallboard is subjected to a suitable drying cycle in a forced draft air oven. Drying consists in heating the gypsum wallboard for 15 minutes at 350°–370° F., then cooling gradually to 120° F. and holding at this temperature for at least 30 minutes.

In this example and in the examples that follow, the bond between the gypsum core and the paper liners was tested according to the procedure set forth hereinafter. In this procedure, the gypsum board was removed from the drying oven and the gypsum core was then broken on the side opposite to the liner surface that was to be tested. This was done, e.g., by scoring the backing liner with a knife in a straight line perpendicular to the machine direction of the board, and thereafter breaking the core against a hard surface. If the adhesion of the backing liner was to be evaluated, then the procedure was merely applied to the face liner rather than to the backing liner. When the core was broken, care was taken to prevent damage to the face liner. After the core was broken, the face liner was then pulled down in a direction away from the break parallel to the surface of the board. The type of bond obtained was classified according to the degree of fiber tear and surface conditions of the core at the point of separation. The types of bond are classified as follows:

(*a*) Good—no splitting or peeling of the liner.
(*b*) Poor—splitting at the edge resulting in delamination of the core just below the surface.
(*c*) Complete failure—peeling of the liner resulting in no fiber tear between core and liner.

The procedure set forth previously was followed in making wallboard with the various starch derivatives presented in the table appearing below. This table also indicates the lesser amounts of these binders which are needed to achieve satisfactory binding, in comparison with the binders heretofore used for this purpose.

| Binder Utilized [1] | D.S. | W.F. | Minimum Quantity of Binder Required for Good Bond (lbs./1000 lbs. of gypsum) |
|---|---|---|---|
| (a) Low viscosity corn flour | | | 8.0 |
| (b) Dextrinized wheat starch | | | 7.5 |
| (c) Acid hydrolyzed corn starch | | | 5.0 |
| (d) Acetate ester of corn starch | .05 | 75 | 0.75 |
| (e) Hydroxyethyl ether of corn starch | .04 | 73 | 0.75 |
| (f) Sulfate ester of tapioca starch | .05 | 82 | 0.75 |
| (g) Succinate ester of corn starch | .03 | 64 | 0.75 |
| (h) Maleate ester of corn starch | .03 | 66 | 1.0 |
| (i) Octenyl succinate ester of corn starch | .05 | 65 | 1.0 |
| (j) Phosphate ester of potato starch | .03 | 68 | 1.0 |
| (k) Tertiary aminoalkyl ether of corn starch [2] | .025 | 74 | 1.0 |
| (l) Hydroxypropyl ether of corn starch | .04 | 70 | 1.0 |

[1] Binders (a), (b), and (c) are typical representations of binders previously used; the remaining binders are compositions exemplary of our binding formulations.
[2] A beta diethyl aminoethyl chloride hydrochloride corn starch ether as prepared by means of the procedure described in Example I of U.S. Patent #2,813,093.

*Example II*

This example illustrates the superior effectiveness of our binding compositions in comparison with the binders previously utilized in the production of low density gypsum wallboards.

The procedures followed in preparing and testing the formulations of this example were the same as those described in Example I, with the exception that the amount of foam added to the gypsum stucco was varied to change the density of the finished board. The results obtained are set forth in the following table:

| Binder | Amount of Binder (lbs./1,000 lb. of gypsum) | Board Wt. (lb./1,000 sq. ft. and ½″ thick) | Bond Evaluation |
|---|---|---|---|
| (a) Acid hydrolyzed corn starch (control) | 5.0 | 2,010 | Good. |
| (b) Acid hydrolyzed corn starch | 10.0 | 1,540 | Com. Fail. |
| (c) Acetate ester of corn starch (D.S.=.05, W.F.=70) | 5.0 | 1,520 | Good. |

*Example III*

This example illustrates the superior binding effectiveness and resistance to heat imparted to the gypsum wallboards prepared by the use of the binding compositions of the process of our invention.

The procedures followed in preparing and testing the formulations of this example were the same as those described in Example I. The gypsum wallboard was heated for 30 minutes at 470° F., then cooled gradually to 120° F. and maintained at this temperature for at least 30 minutes. After the drying was completed, the board samples were then evaluated to determine bonding effectiveness, following the procedure set forth in Example I. The results obtained are set forth in the following table:

| Binder | Amount of Binder (lbs./1,000 lbs. of gypsum) | Bond Evaluation |
|---|---|---|
| (a) Acid hydrolyzed corn starch | 6.0 | Poor. |
| (b) Sulfate ester of corn starch (D.S.=.04, W.F.=80) | 1.2 | Good. |

*Example IV*

This example illustrates the necessity of employing starch derivatives having the prescribed properties of the derivatives utilized in our process in order to realize increased binding effectiveness.

The procedures followed in preparing and testing the formulations of this example were the same as those described in Example I. The results obtained are set forth in the following table:

| Binder | D.S. | W.F. | Amount of Binder (lbs./1,000 lbs. gypsum) | Bond Evaluation |
|---|---|---|---|---|
| (a) Acetate ester of corn starch | .04 | 70 | 0.75 | Good. |
| (b) Acetate ester of corn starch | .007 | 73 | 1.0 | Poor. |
| (c) Acetate ester of corn starch | .15 | 68 | 1.0 | Poor. |
| (d) Acetate ester of corn starch | .05 | 65 | 0.75 | Good. |
| (e) Acetate ester of corn starch | .05 | 30 | 1.0 | Complete Failure. |
| (f) Hydroxyethyl ether of corn starch | .04 | 28 | 1.0 | Complete Failure. |

Thus, it can be seen that unsatisfactory results are obtained when starch derivatives having a D.S. and/or a W.F. other than those specified for our derivatives are used as binders for gypsum wallboards.

Any departure from the above description which conforms to the present invention is intended to be included within the scope of the invention as defined by the following claims.

We claim:

1. The composition of a core material of gypsum and a starch derivative binder, the said starch derivative binder being selected from the group consisting of starch ethers and starch esters having a water fluidity value of at least 50 and a degree of substitution ranging from 0.01 to 0.14.

2. The composition of claim 1, in which the amount of said starch derivative ranges from 0.05% to 3.0% by weight as based on the weight of said core material.

3. A gypsum wallboard comprising at least one cover sheet bonded to a gypsum core material, said core material including as a binder composition therefor a starch derivative selected from the group consisting of starch ethers and starch esters having a water fluidity value of at least 50 and a degree of substitution ranging from 0.01 to 0.14.

4. The gypsum wallboard of claim 3, in which the amount of said starch derivative ranges from 0.05% to 3.0% by weight as based on the weight of said core material.

5. In the process of preparing gypsum wallboard by means of the bonding of at least one cover sheet to a gypsum core material, the improvement which comprises adding to said core material as a binder composition therefor a starch derivative selected from the group consisting of starch ethers and starch esters having a water fluidity value of at least 50 and a degree of substitution ranging from 0.01 to 0.14.

6. The process of claim 5, wherein the amount of said starch derivative ranges from 0.05% to 3.0% by weight as based on the weight of said core material.

References Cited by the Examiner

UNITED STATES PATENTS 2,882,175  4/59  Bailly _____ 106—115

FOREIGN PATENTS 520,249  1/56  Canada.
848,407  1/59  France.

OTHER REFERENCES

Whistler: Industrial Gums (1959), chapter XXXI (pages 728–731).

TOBIAS E. LEVOW, *Primary Examiner.*